(No Model.)

J. J. DEWBERRY.
PLOW.

No. 551,078. Patented Dec. 10, 1895.

Witnesses
Jos. C. Stack.

Inventor
Joel J. Dewberry
By his Attorneys,
C. A. Snow & Co.

United States Patent Office.

JOEL J. DEWBERRY, OF HICKORY FLAT, ALABAMA.

PLOW.

SPECIFICATION forming part of Letters Patent No. 551,078, dated December 10, 1895.

Application filed March 14, 1895. Serial No. 541,774. (No model.)

*To all whom it may concern:*

Be it known that I, JOEL J. DEWBERRY, a citizen of the United States, residing at Hickory Flat, in the county of Chambers and State of Alabama, have invented a new and useful Plow, of which the following is a specification.

My invention relates to plows of the class employed mainly for cultivating the soil around growing plants, the object in view being to provide a simple attachment for plow points or shovels so constructed as to cut through and agitate the soil without turning or throwing it toward and upon the plants, and, furthermore, to provide suitable means for the adjustment of the device, whereby the desired lateral extent may be cultivated during the forward movement of the plow.

Further objects and advantages of the invention will appear in the following description, and the novel features thereof will be particularly pointed out in the appended claims.

Figure 1:
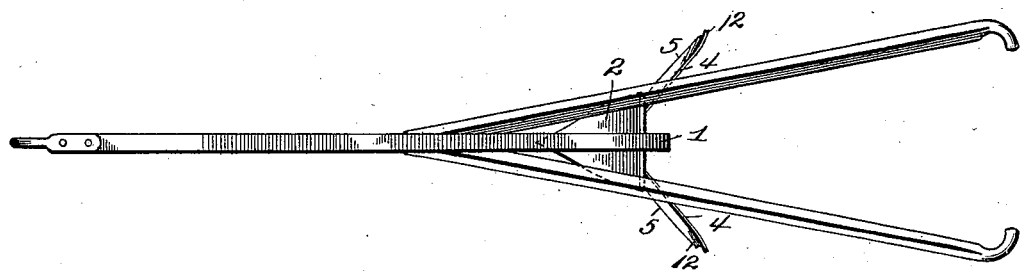
Figure 2:
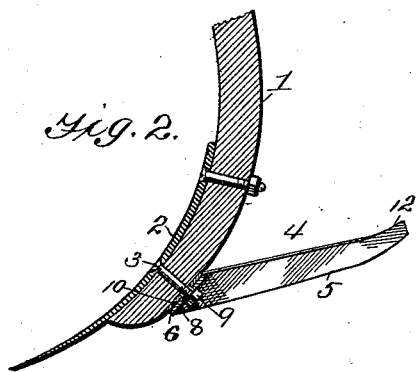
Figure 3:
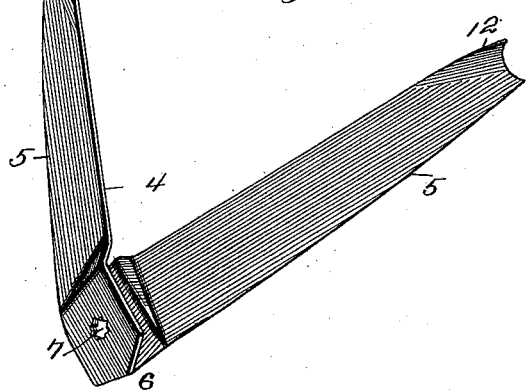
Figure 4:
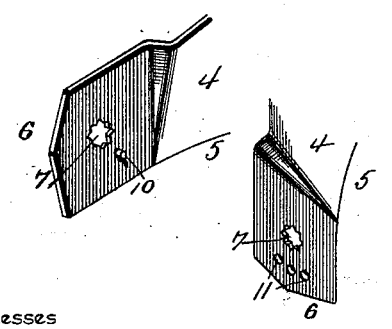

In the drawings, Figure 1 is a perspective view of the cultivating wings or blades embodying my invention, applied in the operative position to a plow point or shovel. Fig. 2 is a vertical section to show the manner of securing the front ends of the wings or blades to the standard. Fig. 3 is a detail view of the wings or blades detached to show means for securing the same in the desired relative positions. Fig. 4 is a detail view of the front ends of the wings or blades to show the means for securing the same at the desired deflection.

Similar numerals of reference indicate corresponding parts in all the figures of the drawings.

1 designates an ordinary standard for a plow point or shovel 2, the latter being secured to the standard by means of a heel-bolt 3, which extends through the front ends of the cultivating wings or blades 4. These cultivating wings or blades are constructed with approximately parallel front and rear edges, of which the former are reduced to form cutting-edges, (shown at 5,) and the front ends of the wings or blades are deflected or bent downward and forward, as shown at 6, to occupy inclined positions approximately parallel with the contiguous portion of the plow point or shovel. These deflected or downwardly and forwardly bent portions of the blades are provided with openings 7 for the bolt 3, and in the construction illustrated in the drawings, said openings are angular and preferably polygonal or star-shaped for the reception of an angular boss 8 on the front side of the nut 9, which is threaded upon said bolt 3. The polygonal shape of the openings in the front ends of the wings or blades provides for arranging the latter at different angles to arrange their rear ends at the desired interval.

In addition to the polygonal openings in the front ends of the wings or blades, one of the latter is provided with a stud 10 to engage one of a series of openings 11 in the other wing or blade, according to the relative positions of the parts.

In operation, the wings or blades, which are inclined downward toward their front ends, with their front extremities in rear of and following the plow point or shovel, cut into and slightly raise and therefore agitate the soil upon both sides of the path of the plow point or shovel, and owing to the downwardly and forwardly inclined position of the cutting-edges the cultivating wings add very slightly to the draft of the plow or shovel and do not add to the difficulty of holding the same in the soil, said inclined edges having a tendency to draw the wings or blades downwardly or into the soil. The inner rear corners of the wings or blades are turned up, as shown at 12, to throw the soil slightly outward or toward the rows of plants sufficiently to properly hill the latter without covering or injuring them by throwing unbroken clods upon the rows. Thus it will be seen that the improved cultivator wings or blades are self-feeding by reason of their inclination, and instead of throwing the soil violently toward the rows of plants cut thereunder and thereby loosen the same and only turn a small portion of the soil contiguous to the rows, whereby the desired hilling of the plants is accomplished without excessive draft or injury to the crop.

Changes in the form, proportion, and the minor details of construction may be resorted to without departing from the spirit or sacrificing any of the advantages of this invention.

Having described my invention, what I claim is—

1. The combination with a plow-point, of rearwardly divergent wings or blades provided at their front ends with deflected overlapping portions having registering openings, said overlapping portions being arranged in rear of the plow-point and the registering openings being engaged by one of the bolts which secures the plow-point to the standard, substantially as specified.

2. The combination with a plow point, of rearwardly divergent cultivator wings or blades secured at their front ends in rear of said plow point, inclining upward toward their rear ends and having approximately parallel front, or cutting, and rear edges, the rear upper or inner angles of the blades being curved outward to turn the soil contiguous to the rows of plants, substantially as specified.

3. The combination with a plow point, of rearwardly divergent cultivator blades inclining upward toward their rear ends and having overlapping front ends arranged in rear of the plow point and provided with registering openings, a bolt engaging the openings in the front ends of the wings, and a stud carried by one of the wings contiguous to the registering openings to engage one of a series of perforations in the other wing, to secure said members at the desired angular adjustment to vary the interval between the rear ends of the wings, substantially as specified.

In testimony that I claim the foregoing as my own I have hereto affixed my signature in the presence of two witnesses.

JOEL J. DEWBERRY.

Witnesses:
 JOHN H. HIGGINS,
 JOHN H. TURNER.